United States Patent [19]
Usui et al.

[11] Patent Number: 5,947,511
[45] Date of Patent: Sep. 7, 1999

[54] INTEGRALLY MOLDED AIR-BAG COVER ARTICLE AND METHOD OF MAKING THE SAME

[75] Inventors: Nobuhiro Usui, Takatsuki; Hitoshi Nakada, Asakuchi-gun; Makoto Hirai, Asakuchi-gun; Shoichi Kohara, Asakuchi-gun, all of Japan

[73] Assignee: Sumitomo Chemical Company Limited, Osaka, Japan

[21] Appl. No.: 08/841,673

[22] Filed: Apr. 30, 1997

[30] Foreign Application Priority Data

Apr. 30, 1996 [JP] Japan .................................. 8-109272

[51] Int. Cl.⁶ .................................................. B60R 21/20
[52] U.S. Cl. ........................................ 280/728.3; 264/255
[58] Field of Search ................................ 280/728.3, 732, 280/731, 730.1; 264/255

[56] References Cited

U.S. PATENT DOCUMENTS 5,395,668  3/1995  Ito et al. .............................. 280/728.3
5,458,361 10/1995  Gajewski ............................. 280/728.3
5,536,037  7/1996  Cherry ................................ 280/728.3

FOREIGN PATENT DOCUMENTS 4-185551   7/1992  Japan .
4-283147  10/1992  Japan .
06285876  10/1994  Japan .

*Primary Examiner*—Peter C. English
*Attorney, Agent, or Firm*—Pillsbury Madison & Sutro LLP

[57] ABSTRACT

An integrally molded air-bag cover article is disclosed which contains an air-bag cover section which is made of a resin and has a periphery, and a frame section which is made of a resin and is integrally and continuously formed with the periphery by way of a weak section. The weak section is constituted by a resin junction in which an interface of the resin constituting the air-bag cover section and an interface of the resin constituting the frame section are joined together by bonding action between the resins. A continuous groove and a continuous protrusion are respectively formed on a front surface and a rear surface of the integrally molded air-bag cover article. The weak section is formed so as to extend from an inner face of the groove to an outer face of the protrusion.

9 Claims, 12 Drawing Sheets

INTEGRALLY MOLDED AIR-BAG COVER ARTICLE AND METHOD OF MAKING THE SAME

BACKGROUND OF THE INVENTION

1. Field of the Invention

The present invention relates to an integrally molded air-bag cover article and a method of making the same and, in particular, to an integrally molded air-bag cover article in which an air-bag cover made of a resin is integrally formed with a part of a vehicle interior equipment made of a resin, and a method of making the same.

2. Related Background Art

It has been well known to attach an air-bag device to a vehicle as means for protecting a driver/passenger in case of emergency of the vehicle. When the vehicle receives a sudden impact due to drastic deceleration, stop, or the like, the air bag is filled with a gas so as to rapidly inflate, thereby projecting in front of or a side of the driver/passenger and protecting the driver/passenger against the sudden impact.

In a vehicle such as automobile, for example, the air-bag device is typically disposed behind a vehicle interior equipment such as instrument panel or door trim, and the air-bag cover in this portion is integrated with the vehicle interior equipment for the sake of appearances, such that the air-bag device is apparently unseen.

When such an air-bag cover is integrally formed with a part of the vehicle interior equipment, while it is necessary for the air-bag cover to normally maintain its form as a part of the vehicle interior equipment; the air-bag cover should instantly open when the vehicle receives a sudden impact, allowing the air bag accommodated in the rear side of the vehicle to push the air-bag cover and smoothly unfold.

Accordingly, known is a method in which, in the case where the air-bag cover is integrally formed as a part of the instrument panel, a plurality of through-holes are formed with intervals along the periphery of a portion of the instrument panel (cover-breaking portion) which becomes the air-bag cover such that, in case of emergency, the cover portion is broken from the instrument panel so as to open easily, while seal members for hiding the through-holes are attached to the through-hole portion (Japanese Patent Application Laid-Open No. 4-185551).

Also, in the case where the air-bag cover is integrally formed as a part of a door trim, it has been known to form the peripheral portion of the cover as a thin portion adapted to break (Japanese Patent Application Laid-Open No. 4-283147).

In these conventional methods, however, since a step for forming through-holes in the peripheral portion of the air-bag cover integrally formed with a vehicle interior equipment or making this peripheral portion thinner is necessary in addition to a series of molding steps, the manufacturing process has become complicated, thereby increasing the processing cost. Also, these methods have not yet been sufficient in terms of easiness in fracture strength control and designing of appearances.

SUMMARY OF THE INVENTION

It is an object of the present invention to provide an integrally molded air-bag cover article in which, while normally maintaining a strength as a part of a vehicle interior equipment such as instrument panel, the air-bag cover can securely and instantly be removed as the air bag inflates upon a sudden impact, and which can be manufactured inexpensively and easily by a series of molding steps alone, can easily adjust its fracture strength, and can yield a favorable appearance.

It is another object of the present invention to provide a method which can efficiently and easily manufacture the above-mentioned integrally molded air-bag cover article.

The integrally molded air-bag cover article in accordance with the present invention comprises an air-bag cover section which is made of a resin and has a periphery, and a frame section, which is made of a resin and is integrally and continuously formed with the periphery by way of a weak section;

wherein the weak section is constituted by a resin junction in which an interface of the resin constituting the air-bag cover section and an interface of the resin constituting the frame section are joined together by a bonding action between the resins;

wherein a continuous groove and a continuous protrusion are respectively formed on the front surface (designed surface) and rear surface (undesigned surface) of the integrally molded air-bag cover article; and wherein the weak section is formed so as to extend from the inner face of the groove to the outer face of the protrusion.

In the integrally molded air-bag cover article in accordance with the present invention, between the air-bag cover section and the frame section holding the same, interfaces of the resins respectively constituting these sections exist and are joined together by the bonding action of these resins. Since the fracture strength of thus configured resin junction is smaller than that in the air-bag cover section and frame section and is uniform, it maintains a strength required for a part of the vehicle interior equipment such as instrument panel at the time of normal usage where a pressure greater than the fracture strength of the resin junction is not applied thereto. On the other hand, when the air bag disposed on the rear side of the air-bag cover article inflates, an inflation pressure greater than the fracture strength of the resin junction is applied to the air-bag cover section so as to break the resin junction, whereby the air-bag cover section is securely and instantly cut off from the frame section.

Also, in the integrally molded air-bag cover article in accordance with the present invention, since the front end portion of the resin junction between the air-bag cover section and the frame section is formed at the inner face of the groove, the appearance of the front surface (designed surface) of the article is prevented from deteriorating due to the resin junction.

Further, since the air-bag cover section and the frame section are molded integrally and substantially at the same time by a series of molding steps alone, which will be explained later, the integrally molded air-bag cover can be manufactured easily and inexpensively without complicating its manufacturing process. Also, since the fracture strength of the resin junction can easily be adjusted as the resin-supplying timing in the molding steps or the like is controlled, an optimum fracture strength can securely be attained in response to the inflation pressure of the air bag or the like.

Here, the joining of the resins refers to a state where the molten or half-molten resins have been solidified while being directly in contact with each other, and the interfaces of both resins are distinguishable at their contact portion and connected together by the bonding action between the resins. When the resins mingle with each other and are molten together or firmly joined together by means of an adhesive or the like, the fracture strength at the resin junction may be so strong that the air-bag cover section is hard to cut off from the frame section, whereby the above-mentioned objects may not be attained.

Preferably, the resin junction is formed as both resins are solidified while the surface of one resin, at least whose surface is solidified, is in contact with the other molten resin. In this case, both resins are prevented from mingling with each other, whereby the interfaces of the resins tend to be securely distinguishable from each other, and the resins tend to be favorably bonded together.

The integrally molded air-bag cover article in accordance with the present invention may further comprise a skin material integrally attached to the front surface thereof. The appearance of the article can further be improved by this skin material. Preferably, in this case, a portion of the skin material is bent into the groove, and at least a part of the portion of skin material bent into the groove has an incision. In this configuration, the skin material is securely broken when the air-bag cover section is cut off from the frame section. Also, since the incision of the skin material is formed within the groove, the appearance of the front surface (designed surface) of the skin material is prevented from deteriorating.

Preferably, in the integrally molded air-bag cover article in accordance with the present invention, the inner edge of the frame section projects to the rear side of the periphery of the air-bag cover section. When the periphery (front side) of the air-bag cover section and the inner edge of the frame section (rear side) are configured so as to partially overlap each other in this manner, the periphery of the air-bag cover section is supported by the inner edge of the frame section from the rear side thereof. Accordingly, the pressure applied to the air-bag cover section from the front side is dispersed into and absorbed by the inner edge (overlapping portion) of the frame section, whereas the pressure applied to the air-bag cover section from the rear side is converged on the resin junction. Accordingly, the maintenance of strength at the time of normal usage and the fracture of the resin junction at the time of air-bag inflation can be attained more securely.

Here, the integrally molded air-bag cover article in accordance with the present invention refers to an article in which an air-bag cover is integrally formed with a part of a vehicle interior equipment such as instrument panel or door trim. While normally functioning as a vehicle interior equipment, this air-bag cover section is detached from the interior equipment when the air bag accommodated in the rear side of the interior equipment is unfolded upon an impact, so as to form an opening through which the air bag projects.

Typical examples of such a vehicle interior equipment include automobile interior equipments such as instrument panel and door trim to which the air bag can be attached. Normally, they are made of a thermoplastic resin.

The method of making an integrally molded air-bag cover article in accordance with the present invention is a method of making the integrally molded air-bag cover article in accordance with the present invention by means of a first mold, which has a first cavity face provided with a continuous groove section and a continuous movable member adapted to project from the inner face of the groove section, and a second mold, which has a second cavity face provided with a continuous protruded section corresponding to the groove section, the method comprising the steps of:

(a) projecting the movable member from the inner face of the groove section of the first mold so as to abut to the outer face of the protruded section, thereby parting a cavity formed between the first and second cavity faces into first and second portions;

(b) supplying a molten first resin (e.g., resin constituting the air-bag cover section) to the first portion;

(c) cooling the first resin so as to form a solidified layer on at least a surface of the first resin;

(d) returning the movable member into the first mold;

(e) supplying a molten second resin (e.g., resin constituting the frame section) to the second portion;

(f) solidifying the first and second resins by cooling; and (g) opening the first and second molds so as to remove the article therefrom.

In the method of the present invention, since the molten second resin is supplied after the solidified layer is formed on at least the surface of the first resin, the air-bag cover section and the frame section are molded integrally and substantially at the same time by a series of molding steps alone, while both resins are prevented from mingling with each other. Accordingly, the method of the present invention can efficiently and securely manufacture the integrally molded air-bag cover article in accordance with the present invention, in which the interfaces of both resins can securely be distinguished from each other and the resins are favorably bonded together. Also, the fracture strength of the resin junction can easily be adjusted as the resin-supplying timing in the molding steps or the like is controlled, whereby an optimum fracture strength can securely be attained in response to the inflation pressure of the air bag or the like.

The method of the present invention may further comprise a step (h) of disposing a skin material between the first and second cavity faces prior to the step (a). In this case, the integrally molded air-bag cover article in accordance with the present invention having a skin material integrally attached thereto can efficiently and securely be manufactured by the above-mentioned series of molding steps alone.

Also, while the cavity formed between the first and second cavity faces is placed in an open state in the steps (a) and (b), the method of the present invention may further comprise, between the steps (b) and (c), a step (i) of closing the first and second molds so as to place the cavity in a closed state. When an injection compression molding technique combining so-called press molding and injection molding together is employed in this manner, the integrally molded air-bag cover article of the present invention tends to be manufactured more efficiently and securely.

Here, the above-mentioned "open state" is defined as a state wherein a cavity clearance between the first and second cavity faces is larger than the thickness of a desired product. Preferably, the open state includes a first open state wherein the first and second molds are arranged with a cavity clearance therebetween such that the product can be removed, and a second open state wherein the cavity clearance is smaller than that in the first open state.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, the present invention will be explained in detail with reference to the accompanying drawings. Among the drawings, parts identical or corresponding to each other will be referred to with marks identical to each other.

First, a preferable embodiment of the integrally molded air-bag cover article in accordance with the present invention will be explained.

Figure 1:
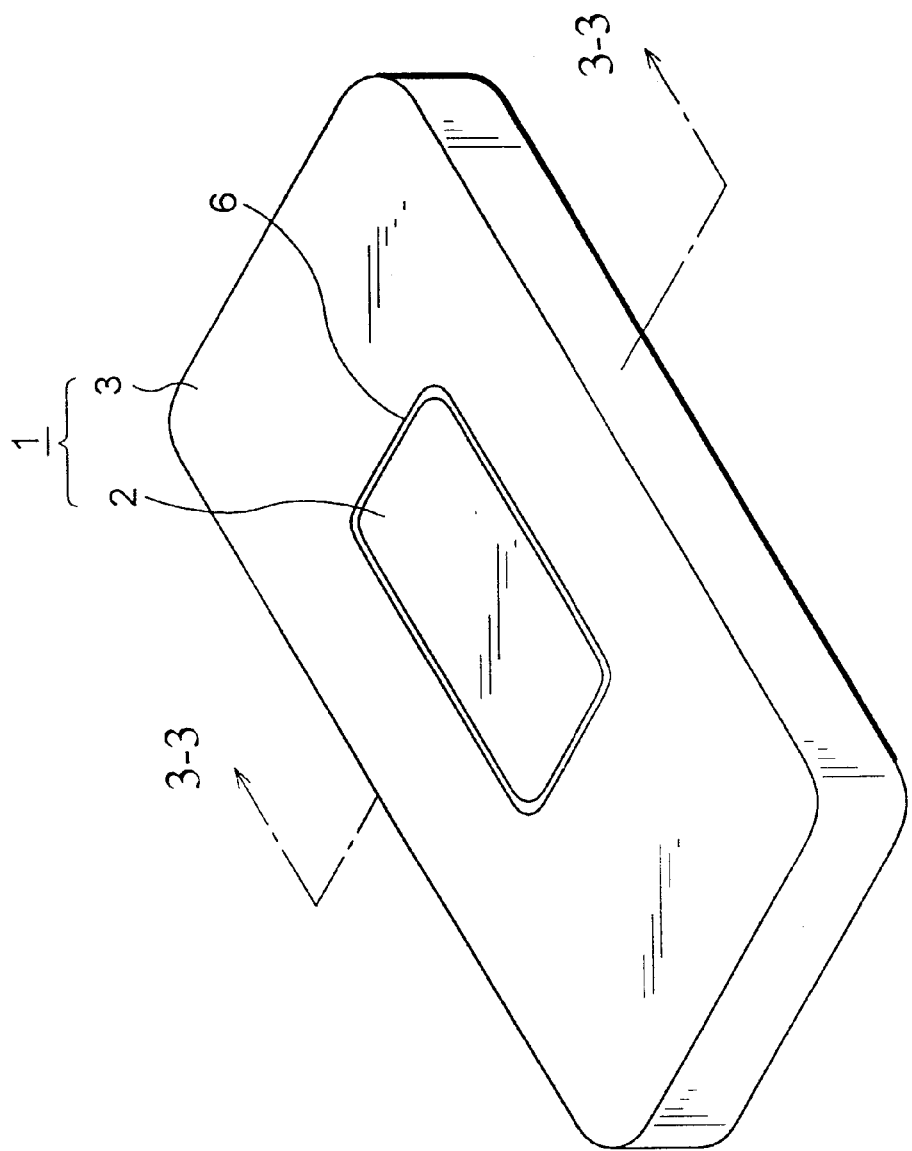
FIG. 1 is a perspective view showing the front side of the integrally molded air-bag cover article in accordance with one embodiment of the present invention.

FIGS. 1 to 3 and 4A are respectively a perspective view showing the front side of the integrally molded air-bag cover article in accordance with one embodiment of the present invention, a perspective view showing the rear side thereof, a cross-sectional view taken along line 3—3 of the article shown in FIG. 1, and a partial cross-sectional view showing the article shown in FIG. 1 near its weak section.

As shown in FIGS. 1 to 3 and 4A, the integrally molded air-bag cover article (1) comprises an air-bag cover section (air-bag cover; 2) and a frame section (3), while the periphery (2a) of the air-bag cover section (2) and the inner edge (3a) of the frame section (3) are integrally and continuously formed with each other by way of a weak section (4).

The integrally molded air-bag cover article (1) is a vehicle interior equipment such as instrument panel or door trim, and the air-bag cover section (2) is integrally molded with a part thereof. Here, the air-bag cover (2) is disposed so as to correspond to the position of the air-bag device (not depicted) attached to the rear side of the instrument panel, door trim, or the like, while the size thereof is appropriately set such that it is not too large or too small when the air bag (not depicted) is inflated.

In the integrally molded air-bag cover article (1), a continuous protrusion (5) and a continuous groove-like recess (groove; 6) are respectively formed in the undesigned surface (rear surface) and designed surface (front surface) so as to correspond to the periphery (2a) of the air-bag cover section (2).

Also, the weak section (4) in the integrally molded air-bag cover article (1) is constituted by a resin junction in which interfaces of a resin constituting the air-bag cover section (2) and a resin constituting the section (frame section; 3) other than the air-bag cover section (2) are connected together by the bonding action between these resins. The weak section (resin junction; 4) is formed so as to extend from the inner face of the groove (6) to the outer face of the protrusion (5). Namely, the air-bag cover section (2) and the frame section (3) are joined together so as to form a resin interface at and around the protrusion (5), while the resin interface at the junction (4) of both resins is exposed to the groove-like recess (6). Consequently, the fracture strength at this resin junction (4) is lower than that in the other portions (air-bag cover section (2) and frame section (3)).

Though not restricted in particular, the cross-sectional form of the groove-like recess (6) is U-shaped or quadrangular in many cases and may be V-shaped in some cases. Here, when the groove-like recess (6) has a U-shaped or quadrangular cross-section, its width is not necessarily the same between its upper and lower ends, and the width of the upper end may be somewhat greater than that of the lower end.

Though not restricted in particular, the width of the groove-like recess (6) should not preferably be too large from the viewpoint of appearances of the product, since the opening portion of the groove-like recess (6) is on the designed surface side. Thus, normally, the width of the groove-like recess (6) at the upper end thereof is preferably not greater than 5 mm and more preferably not greater than 3 mm. It also holds true in the case where a skin material is attached to the surface of the article. Without being restricted in particular, it is sufficient for the lower limit of the width of the groove-like recess (6) to be such that the groove-like recess (6) can be recognized as a groove. In general, the width of the groove-like recess (6) is preferably at least 0.3 mm. It also holds true when the skin material is bent into the groove-like recess (6). Also, the depth of the groove-like recess (6) is arbitrary and not restricted in particular. In general, however, it is preferably within the range of ½ to five times as much as the thickness of the base material (portion other than the groove and protrusion).

Though the size of the protrusion (5) depends on the depth and width of the groove-like recess (6) and is not restricted in particular, the lower limit of its width is normally not smaller than the sum of the thickness of base material portion and the width of groove-like recess and particularly preferably not smaller than the sum of 2×(thickness of base material portion)+(width of groove-like recess). On the other hand, the upper limit of the width of the protrusion (5) is preferably not greater than the sum of 5×(thickness of base material portion)+(width of groove-like recess).

Also, though the height of the protrusion (5) depends on the depth of the groove-like recess (6) and the position where the resin junction (4) is disposed, in general, it preferably has such a height that the distance between the tip portion of the protrusion (5) and the bottom portion of the groove-like recess (6) is within the range of ½ to four times as much as the thickness of the base material.

In the following, the resin junction (4) having a resin interface, which is an important feature of the present invention, will be explained.

When a resin molded article is to be manufactured by an injection molding or injection compression molding technique, a molten resin is injected and supplied from a resin gate in a state where the molds are closed with a predetermined cavity clearance or in a state where, though the molds are open, the cavity clearance therebetween is very narrow. Depending on the form of the product, the molten resin is supplied between the molds from a plurality of resin gates.

When the molten resin is supplied between the molds from a plurality of resin gates, flows of molten resin from the respective resin gates merge together within the cavity. Here, in general, the difference in pressure between both resins within the cavity is changed so as to prevent the resin interface from being formed at the portion where both resins come into contact with each other, or the resin temperature is raised so as to prevent the viscosity of both resins in the cavity from lowering, whereby the molding condition is selected such that both resins fuse with each other and one resin enters the inside of the other resin, making the resin interface unclear or nonexistent.

Figure 3:
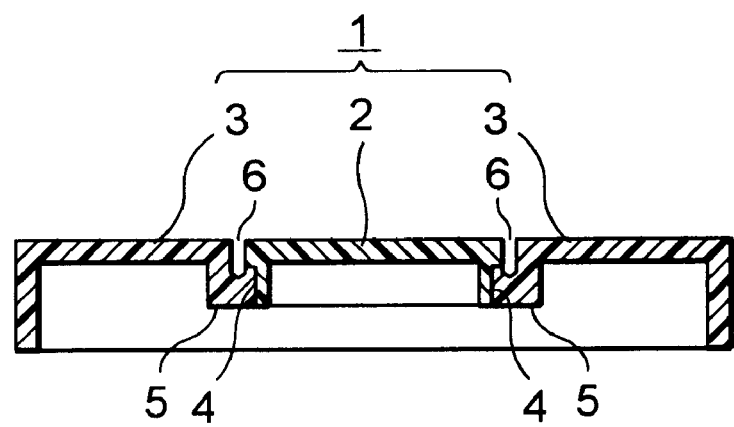
FIG. 3 is a cross-sectional view taken along line 3—3 of the integrally molded air-bag cover article shown in FIG. 1.
Figure 4A:
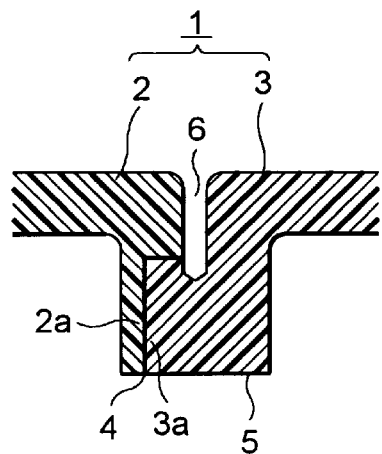
FIGS. 4A to 4D are respectively partial cross-sectional views of examples of the integrally molded air-bag cover article in accordance with the one embodiment of the present invention near its weak section.

By contrast, in the integrally molded air-bag cover article (1) in accordance with the present invention, as shown in FIG. 3 and FIG. 4A, the resin constituting the air-bag cover section (2) and the resin constituting the other section (3) are formed such that the resin interface (4) of both resins is formed at the peripheral portion of the air-bag cover section (2), the air-bag cover section (2) and the other section (3) are directly joined together upon the bonding action between the resins, and one end of the resin interface (4) is exposed to the inner face of the groove-like recess (6) so as to longitudinally extend from the inner face of the groove-like recess (6) to the outer face of the protrusion (5). Consequently, the bonding strength of both resins is appropriately and uniformly reduced at the resin interface (4) so as to have such a degree of fracture strength that its form can be maintained at the time of normal usage but, at the time when the air bag unfolds and inflates upon an impact, the resin interface (4) is broken due to the resulting pressure, whereby the air-bag cover section (2) is cut off from the frame section (3).

It is important in the present invention that the resin interface (4) exposing its one end is thus directly joined to the inner face of the groove-like recess (6) so as to longitudinally extend from the inner face of the groove-like recess (6) to the outer face of the protrusion (5). When both resins are joined together such that the resin interface therebetween is unclear or inexistent so as not to form a resin interface in the thickness portion of the base material as in the case of the above-mentioned conventional resin article, the strength at the joint becomes so strong that air-bag cover is not broken in response to an impact, whereby the air bag accommodated therein cannot be unfolded and, thus, the objects of the present invention cannot be attained.

Thus, since the resin interface (4) is formed so as to appear at the inner face of the groove-like recess (6), the boundary portion of the resin interface cannot be seen from the designed surface side of the article (1), thereby preventing the appearance of the interior equipment from deteriorating, and the air-bag cover section (2) is apparently broken along the groove-like recess (6) upon an impact.

Here, the resin interface (4) may be broken at the time of normal usage upon a slight external force when the fracture strength thereof is too low, whereas it may be hard to break upon an impact when its fracture strength is too high. Accordingly, a well-balanced desired level of strength is necessary. Such strength can be adjusted by the resin interface area and joining condition.

For example, under the condition where the base material thickness is the same, as the area of the resin interface (4) increases, the joining area becomes broader, thereby yielding a higher fracture strength. On the other hand, as the area of the resin interface (4) decreases, the joining area becomes smaller, thereby yielding a lower fracture strength. In order to increase the area of the resin interface (4), the cross-sectional length of the resin interface (4) may be made greater. In order to decrease the area of the resin interface (4), it may be formed with a smaller cross-sectional length.

Also, the joining condition is such that the resin forming the air-bag section (2) and the resin forming the other section (3) are prevented from merging together in their completely molten states. For example, employed is a method in which the molten resin for forming the air-bag cover section (2) is initially supplied and cooled till it is solidified or almost solidified (to a state where a solidified layer is formed on at least the surface thereof) so as to lower its fluidity, and then the molten resin for forming the other section (3) is supplied thereto.

Also, in the integrally molded air-bag cover article (1) in accordance with the present invention, as shown in FIG. 4A, it is preferable that the inner edge (3a) of the frame section (3) project to the rear side of the periphery (2a) of the air-bag cover section (2). When the periphery (2a; front side) of the air-bag cover section (2) and the inner edge (3a; rear side) of the frame section (3) are configured so as to partially overlap each other in this manner, the periphery (2a) of the air-bag cover section (2) is supported by the inner edge (3a) of the frame section (3) from the rear side thereof. Accordingly, the pressure applied to the air-bag cover section (2) from the front side is dispersed into and absorbed by the inner edge (3a) of the frame section (3) overlapping the periphery (2a), whereas the pressure applied to the air-bag cover section (2) from the rear side is converged on the resin junction (4).

Figure 2:
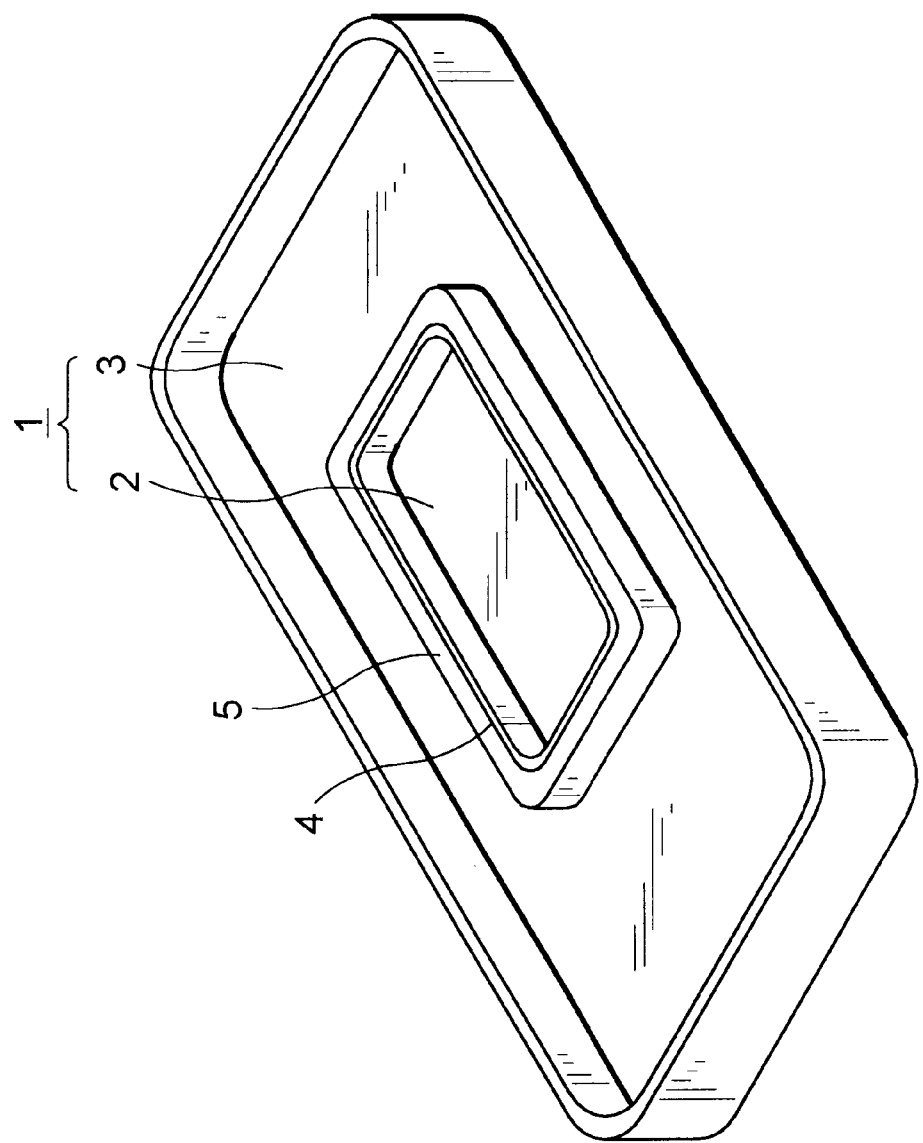
FIG. 2 is a perspective view showing the rear side of the integrally molded air-bag cover article shown in FIG. 1.
Figure 5:
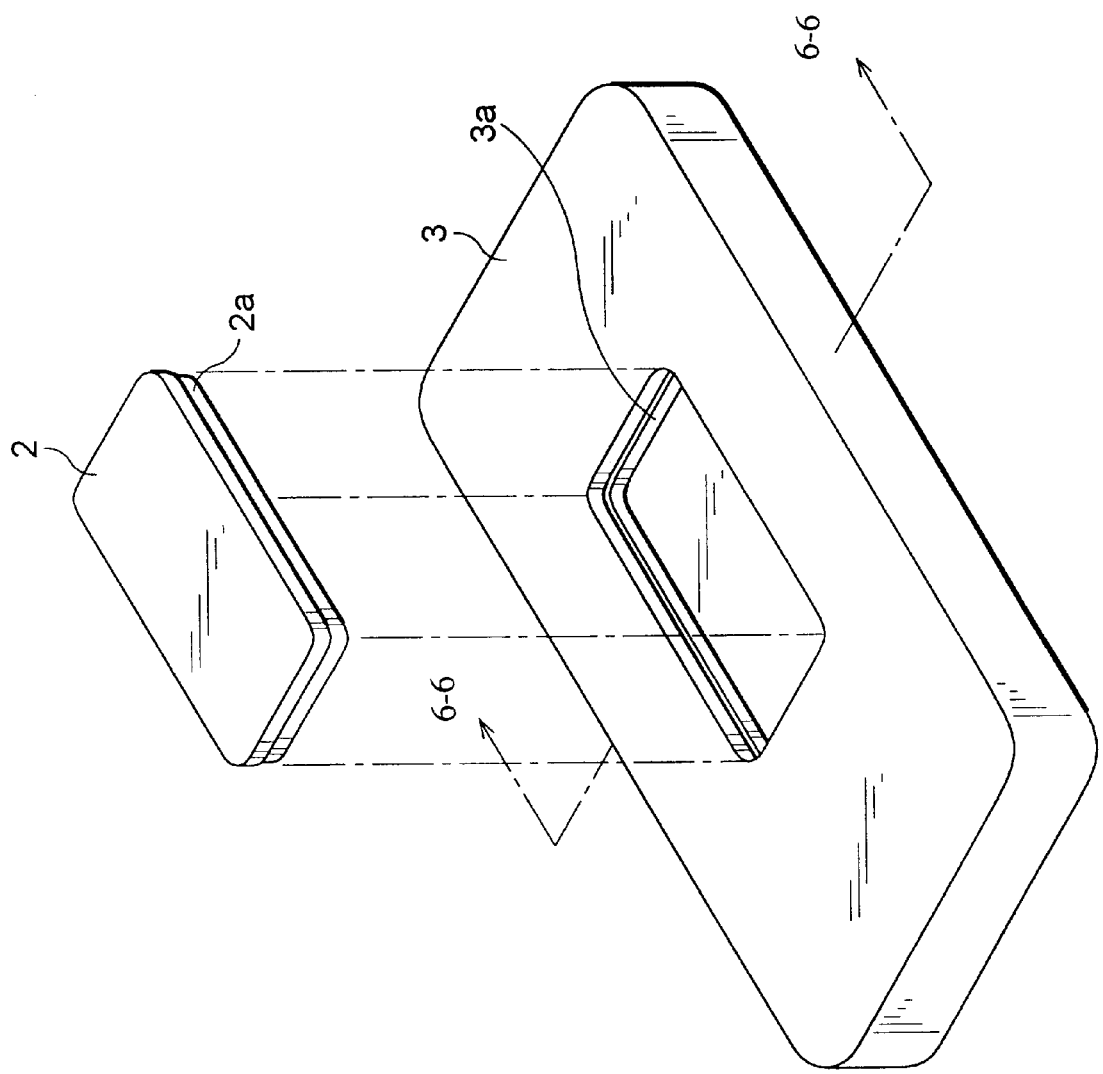
FIG. 5 is an exploded perspective view of the integrally molded air-bag cover article shown in FIG. 1.
Figure 6:
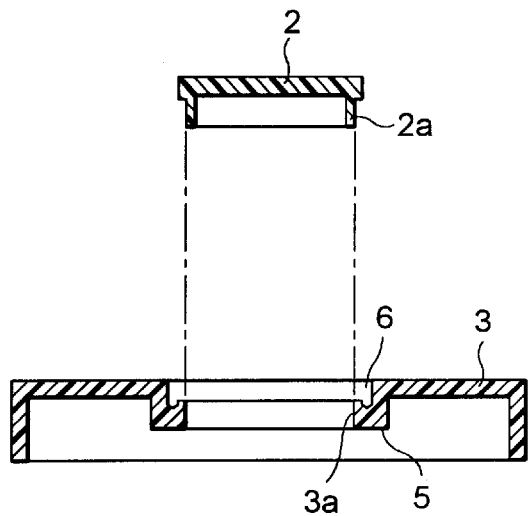
FIG. 6 is a cross-sectional view taken along line 6—6 of the exploded integrally molded air-bag cover article shown in FIG. 5.

In thus configured integrally molded air-bag cover article (1) in accordance with the present invention, the strength required for a part of the vehicle interior equipment such as instrument panel is kept at the time of normal usage where a pressure greater than the fracture strength of the resin junction (4) is not applied thereto, whereby the integral form shown in FIGS. 1 to 3 is maintained. By contrast, when the air bag (not depicted) disposed on the rear side of the air-bag cover section (2) inflates, an inflation pressure greater than the fracture strength of the resin junction (4) is applied to the air-bag cover section (2) from its rear side, whereby the resin junction (4) constituted by the periphery (2a) of the air-bag cover section (2) and the inner edge (3a) of the frame section (3) is broken as shown in FIGS. 5 and 6, whereby the air-bag cover section (2) is securely and instantly cut off from the frame section (3).

The air-bag cover section (2) and the other section (frame section; 3) of the integrally molded air-bag cover article (1) may be formed either by thermoplastic resins different from each other or by the same resin.

Examples of such thermoplastic resins include typical thermoplastic resins used for extrusion, injection molding, press molding, and the like, such as polyethylene, polypropylene, polystyrene, acrylonitrile-styrene-butadiene copolymer, polyvinyl chloride, polyamide, polycarbonate, polyethylene terephthalate, polybutylene terephthalate, polyphenylene ether, styrene-acrylonitrile copolymer, and acrylic resin; their mixtures; their polymer alloys; and their modified products. They are collectively referred to as thermoplastic resin in the present invention. Though such thermoplastic resins can be used in the integrally molded air-bag cover article (1) in accordance with the present invention without any limitation in particular, polypropylene resins are preferably used from the viewpoint of cost, performance, and the like.

Of course, these thermoplastic resins may be used alone; together with inorganic fillers such as talc, glass fiber, and calcium carbonate contained therein; or together with various compounding agents such as normally used stabilizer and pigment contained therein.

Though one preferred embodiment of the integrally molded air-bag cover article in accordance with the present invention is explained in the foregoing, the article in accordance with the present invention should not be restricted thereto.

Figure 7:
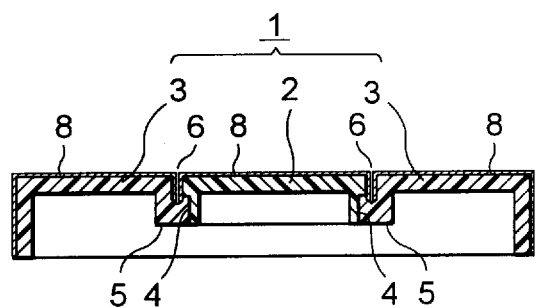
FIG. 7 is a cross-sectional view showing the integrally molded air-bag cover article in accordance with another embodiment of the present invention.
Figure 8:
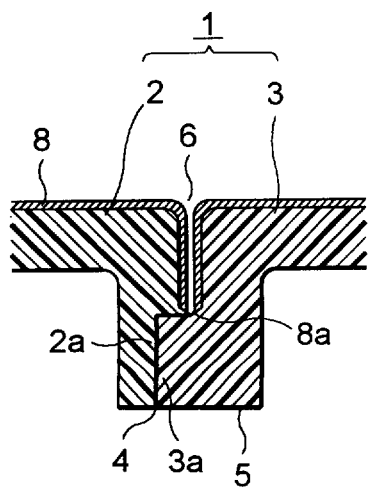
FIG. 8 is a partial cross-sectional view showing the integrally molded air-bag cover article shown in FIG. 7 near its weak section.

Namely, while the above-mentioned embodiment exemplifies a case where no skin material is attached to the surface, a skin material (8) may be attached to the surface of the integrally molded air-bag cover article (1) in accordance with the present invention including the air-bag cover section (2) as shown in FIGS. 7 and 8. Such a skin material (8) can further improve the appearance as an interior equipment.

In this case, as shown in FIG. 8, a portion of the skin material (8) is bent into the groove-like recess (6), while at least a part of the portion of the skin material (8) bent into the groove-like recess (6) preferably has an incision (8a). Since the incision (8a) is provided, the skin material (8) is securely broken when the air-bag cover section (2) is cut off from the frame section (3). Also, since the incision (8a) of the skin material (8) is formed within the groove-like recess (6), the appearance of the front surface (designed surface) of the skin material (8) is prevented from deteriorating.

Examples of the skin material (8) used for this purpose include woven cloth, knitted cloth, nonwoven cloth, and the like, as well as sheets and films of various thermoplastic resins and thermoplastic elastomers. Also, thermoplastic resin foams of polyolefin, polyvinyl chloride, polystyrene, and the like; thermosetting resin foams of polyurethane and the like; or rubber foams of 4-polybutadiene, ethylene-propylene copolymer, and the like can be used.

Such skin materials (8) may be used either independently or as a laminate in which at least two kinds of skin materials are combined together, such as a two-sheet laminate comprising a sheet made of polyvinyl chloride or thermoplastic elastomer and a polyolefin resin foam attached thereto, and a three-sheet laminate further comprising a backing thermoplastic sheet for protecting the foam. Also, the surface of such a skin material (8) may appropriately be provided with an irregular pattern such as emboss or subjected to decorating processing.

Figure 4B:
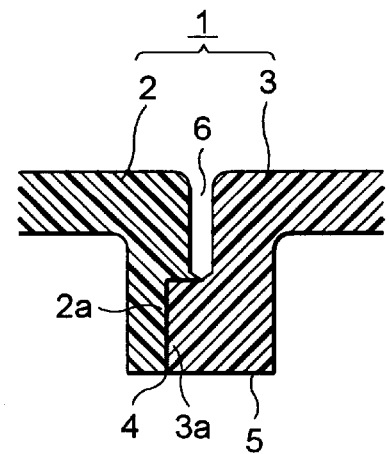
Figure 4C:
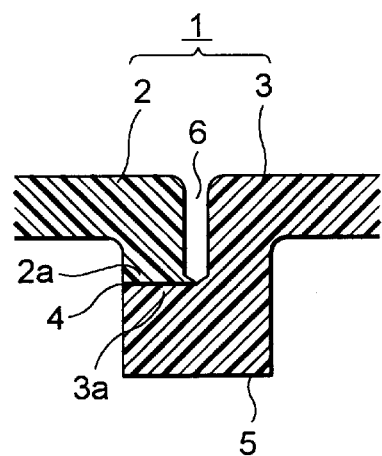
Figure 4D:
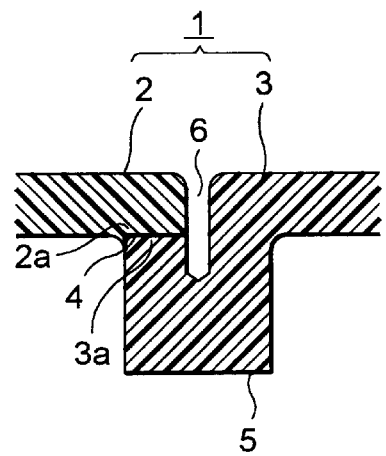

Also, the form of the resin junction (resin interface; 4) longitudinally extending from the inner face of the groove (6) to the outer face of the protrusion (5) is not restricted to that shown in FIG. 4A composed of a surface extending from the side face of the groove (6) on the side of the air-bag cover section (2) so as to be perpendicular to the longitudinal direction (height direction) of the protrusion (5) and a surface extending from the bottom face of the protrusion (5) in parallel with the longitudinal direction thereof. Namely, the resin junction (4) may be formed by a surface extending from the bottom face of the groove (6) so as to be perpendicular to the longitudinal direction of the protrusion (5) and a surface extending from the bottom face of the protrusion (5) in parallel with the longitudinal direction as shown in FIG. 4B; by a surface extending from the side face of the groove (6) on the side of air-bag cover section (2) so as to be perpendicular to the longitudinal direction of the protrusion (5) as shown in FIG. 4C; or a surface extending from the side face of the groove (6) on the side of air-bag cover section (2) so as to be perpendicular to the longitudinal direction of the protrusion (5) and a surface extending from a side face of the protrusion (5) in parallel with the longitudinal direction thereof as shown in FIG. 4D. Here, in each of FIGS. 4A to 4D, the resin junction (4) is configured such that the inner edge (3a) of the frame section (3) projects to the rear side of the periphery (2a) of the air-bag cover section (2), whereby a part of the periphery (2a) on the front side overlaps with a part of the inner edge (3a) on the rear side.

In the following, the method of making the integrally molded air-bag cover article in accordance with a preferred embodiment of the present invention will be explained.

While the integrally molded air-bag cover article (1) in accordance with the present invention having such a resin interface at the resin junction (4) between the air-bag cover section (2) and the other section (frame section; 3) can be manufactured by such methods as injection molding, injection compression molding, and stamping molding, explained in the following is a manufacturing example using injection compression molding method, which typically represents these methods.

First, the mold assembly suitably used in the method of the present invention will be explained.

Figure 9:
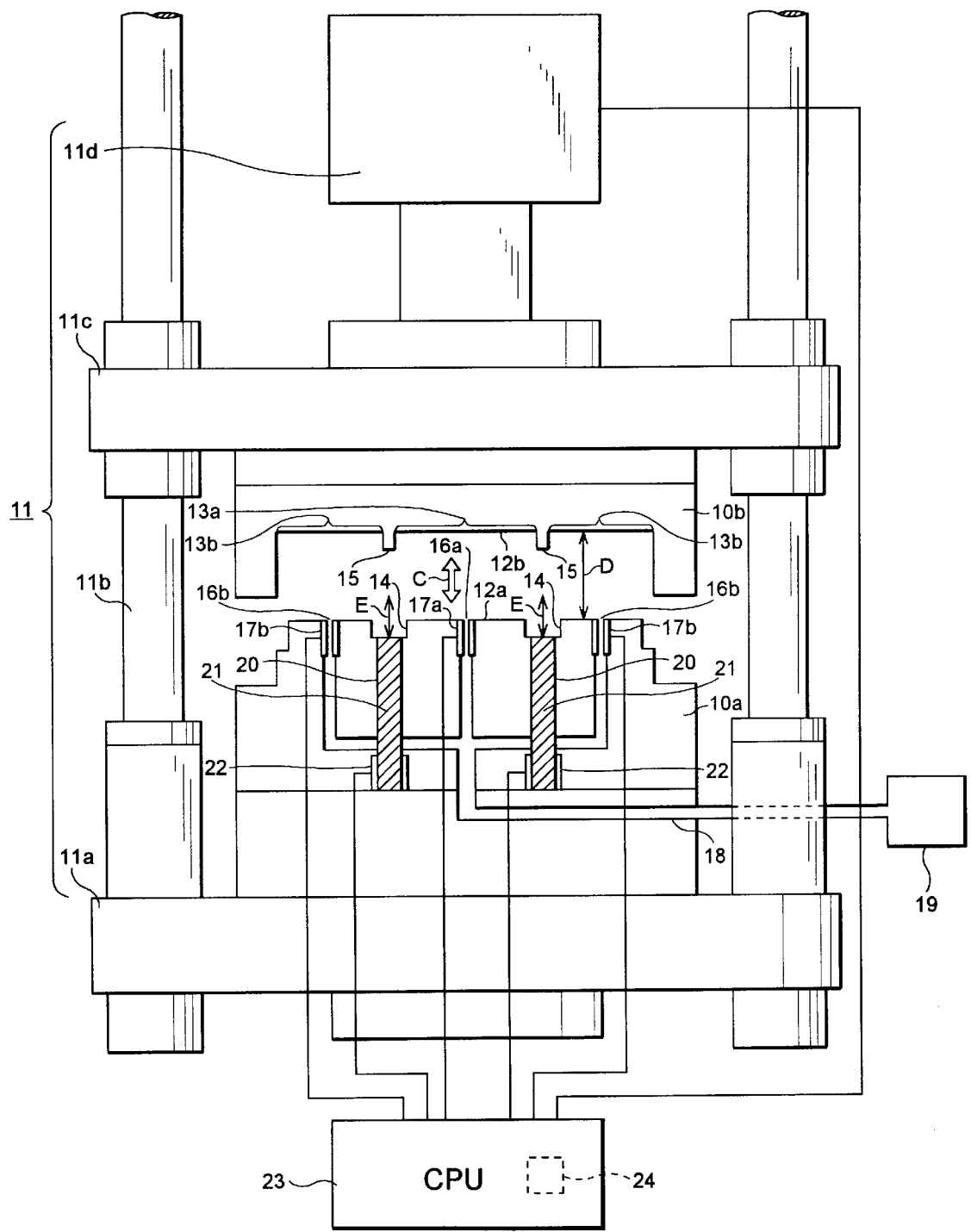
FIG. 9 is a schematic cross-sectional view showing one embodiment of the mold assembly for realizing the method in accordance with the present invention.

The mold assembly shown in FIG. 9 is constituted by a first mold (10a) and a second mold (10b), each of which is attached to a press unit (11). In FIG. 9, the first mold (10a; fixed mold) is secured to a fixed frame (11a) of the press unit (11). The second mold (10b; movable mold) is secured to a movable frame (11c) which is connected to the fixed frame (11a) through a connecting rod (11b). A driving unit (11d) for the second mold (10b) is connected to the movable frame (11c), so that the second mold (10b) is movable in directions C (indicated by double-ended arrow C) in FIG. 9. Here, without being restricted in particular, the driving unit (11d) for the second mold (10b) may be a hydraulic driving unit, for example.

The first and second molds (10a, 10b) respectively have cavity faces (12a, 12b) opposing each other and corresponding to the shape of a desired product. When the first and second molds (10a, 10b) are closed, the cavity faces (12a, 12b) define a cavity space coinciding with the outer shape of the desired product.

The second mold (10b) can be moved, by the press unit (11), among (i) a first open position where a cavity clearance (D in FIG. 9) between the cavity faces (12a, 12b) of the first and second molds is maintained in a state (first open state) wherein the product can be taken out from between the first and second molds (10a, 10b); (ii) a second open position where the cavity clearance is maintained in a state (second open state) to be smaller than that in the first open state (iii) a closed position where the cavity clearance is maintained in a state (closed state) to substantially match the thickness of the desired product. The first and second molds (10a, 10b) can be maintained at a predetermined closing pressure by the press unit (11). The first and second molds (10a, 10b) shown in FIG. 9 are in the first open state.

The first mold (10a) shown in FIG. 9 is a so-called male mold whose cavity face (12a) is formed as a projecting portion, whereas the second mold (10b) is a so-called female mold whose cavity face (12b) is formed as a recessed portion. Alternatively, the first and second molds may respectively be female and male molds. In addition, the first and second molds may respectively be the movable and fixed molds, or both of the molds may be movable molds. Further, the first and second molds may respectively be upper and lower molds.

Here, the cavity space defined by the first and second cavity faces (12a, 12b) comprises a first portion (13a) for molding the air-bag cover section (2) and a second portion (13b) for molding the other section (frame section; 3). A continuous groove section (14) having a shape corresponding to the protrusion (5) is formed at the boundary portion (position corresponding to the periphery (2a) of the air-bag cover section (2)) between the first and second portions (13a, 13b) in the first cavity face (12a), whereas a continuous protruded section (15) having a form corresponding to the groove (6) is formed at the above-mentioned boundary portion in the second cavity face (12b).

The cavity face (12a) of the first mold (10a) has at least one each of first and second resin gates (16a, 16b) for supplying molten resins to first and second portions (13a, 13b), respectively. First and second gate opening/closing means (17a, 17b) are respectively disposed around the first and second resin gates (16a, 16b) so as to independently control the opening and closing actions of the latter. Here, the gate opening/closing means may be either mechanical means (e.g., shut-off pin) or means (e.g., shut-off heater) for melting or solidifying the resin near the corresponding gate. The number of the first and second resin gates (16a, 16b) is appropriately determined according to the size of the first and second portions, the shape of the desired product, or the like. A resin extruding unit (19) is connected to the first and second resin gates (16a, 16b) by way of a resin passage (18) formed in the first mold (10a).

The first mold (10a) in the mold assembly shown in FIG. 9 has a slit (20) communicating with the groove section (14) and receiving therein a movable member (21) which temporarily parts the first and second portions (13a, 13b) from each other. The movable member (21) is connected to a driving unit (22) and can move (slide) in directions E (directions substantially in parallel with the mold opening and closing directions C) shown in FIG. 9. Accordingly, the movable member (21) can be moved between a first position where it is completely received within the first mold (10a) and a second position where the upper portion thereof projects from the cavity face (12a) and abuts to the outer face of the protruded section (15). Without being restricted in particular, the driving unit (22) may be, for example, a driving unit utilizing pneumatic or hydraulic pressure, or an electromagnetic driving unit.

A control unit (CPU; 23) is connected to the first and second gate opening/closing means (17a, 17b), the driving unit (22) for movable member, and the driving unit for press unit in order to control them. Their operations, the closing pressure of the first and second molds (10a, 10b), and the like are controlled by the control unit (23). Periods during which the first and second resin gates (16a, 16b) are respectively opened, a period extending from closing of the first resin gate (16a) to opening of the second resin gate (16b), a period extending from closing of the second resin gate (16b) to actuating of the driving unit (11d) for press unit, and the like are controlled by a timer (24) within the control unit (23).

Figure 10:
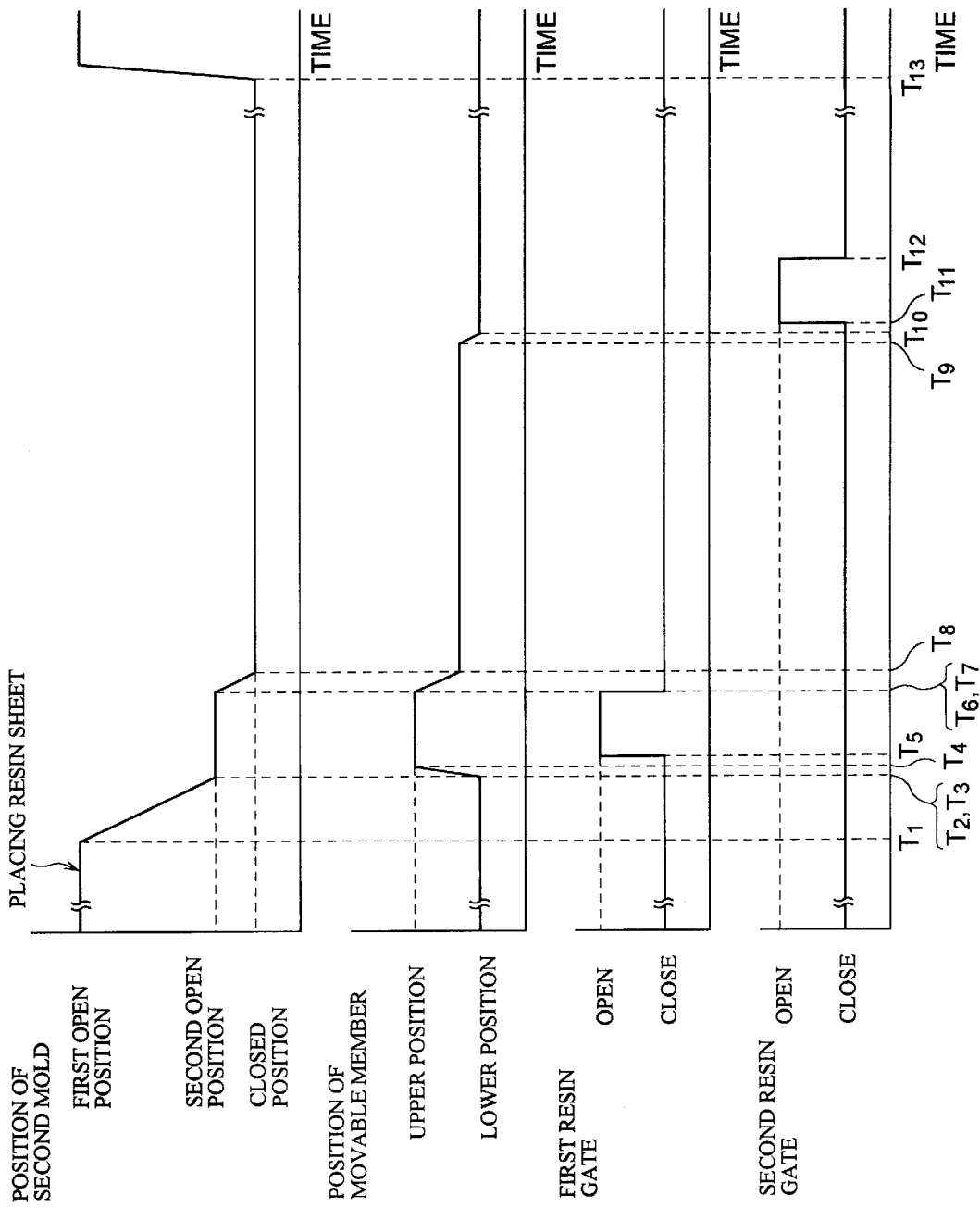
FIG. 10 is a timing chart showing operations of the second mold, movable member, and first and second resin gates in one embodiment of the method in accordance with the present invention.

In the following, with reference to the timing chart shown in FIG. 10, the method of making the integrally molded air-bag cover article shown in FIGS. 1 to 3 will be explained.

First ($T_1$ to $T_2$), the first and second molds (10a, 10b) are shifted from the first open state to the second open state, and then ($T_3$ to $T_4$) the movable member (21) is caused to project (slide to the second position) from the inner face of the groove section (14) of the first mold (10a) so as to abut to the outer face of the protruded section (15) of the cavity face (12b) of the second mold (10b).

Figure 11:
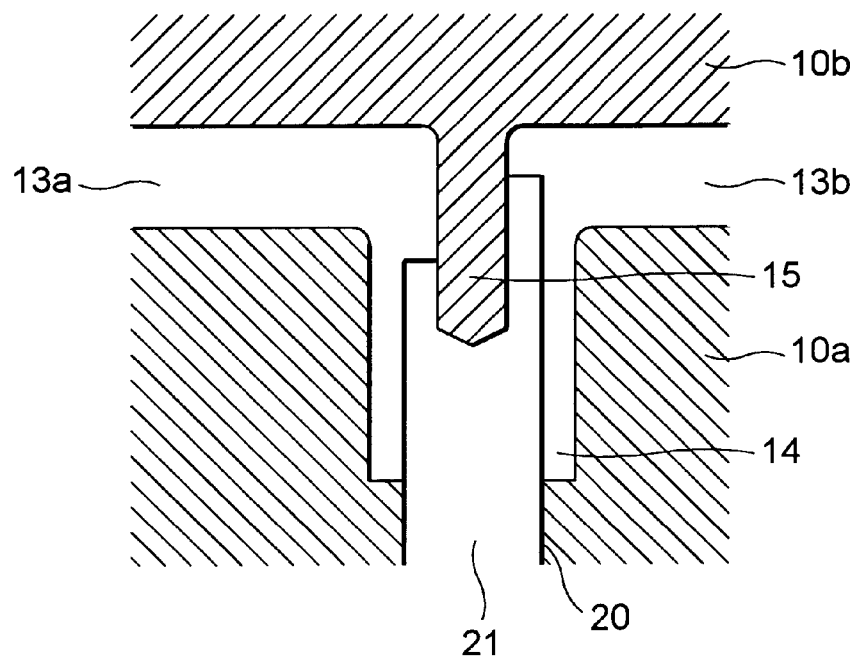
FIG. 11 is a partial cross-sectional view showing a state where the movable member projecting from the first mold abuts to the protruded section of the second mold.

FIG. 11 shows a partial cross-sectional view of the state where the movable member (21) abuts to the outer face of the protruded section (15). The movable member (21) is temporarily parting the first portion (13a) to be supplied with the resin for constituting the air-bag cover section (2) and the second portion (13b) to be supplied with the resin for constituting the other section (3) from each other, and is provided in order to form the resin interface (4) at a portion where both resins merge together. Though the shape of the movable member (21) can arbitrarily be set according to the shape of the resin interface (4) to be formed thereby, it should be configured such that the tip portion and/or side wall portion of the movable member (21) can abut to the protruded section (15) at least at the initial resin-supplying time for the first portion (13a) or second portion (13b), whereby the molten resin supplied to one portion is blocked by the movable member (21) from flowing into the other portion.

In FIG. 11, the tip portion of the movable member (21) abuts to the protruded section (15) so as to mate with the tip portion of the latter, such that a surface thereof in one direction (on the second portion (13b) side in FIG. 11) engages with the protruded section (15) more deeply.

This configuration is effective in preventing the protruded section (15) from breaking due to the resin pressure when the first molten resin supplied to the first portion (13a) flows within and fills the first portion (13a) and in preventing the first molten resin from flowing into the second portion (13b) from the gap between the movable member (21) and the protruded section (15).

The position and cross-sectional form of the resin interface (4) can be adjusted by the form or arrangement of the movable member (21). For example, in the case where the molten resin is initially supplied to the first portion (13a) while the movable member (21) shown in FIG. 11 is used, the interior equipment (1) having the resin interface (4) configured as shown in FIG. 4A can be obtained.

Here, in order to form the resin interface (4) having a cross-sectional form such as that shown in FIG. 4C, for example, the outer circumferential face of the movable member (21) at least on the first portion (13a) side is made to slide on the inner wall of the groove section (14), while the tip portion thereof is made horizontal and abut to the tip portion of the protruded section (15). Of course, in this case, the movable member (21) may be configured so as to enclose therewith the portion of the protruded section (15) on the side of the second portion (13b) bordered by the tip portion of the protruded section (15).

Figure 12:
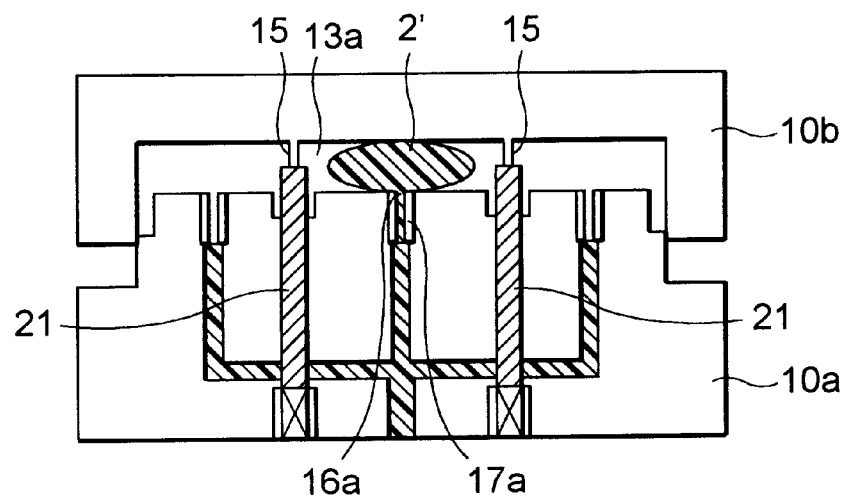
FIGS. 12 to 14 and 16 are schematic cross-sectional views respectively showing the states of the respective manufacturing steps in the method in accordance with the present invention, in which the molded article shown in FIG. 1 is manufactured by means of the mold assembly shown in FIG. 9 according to the timing chart shown in FIG. 10.
Figure 13:
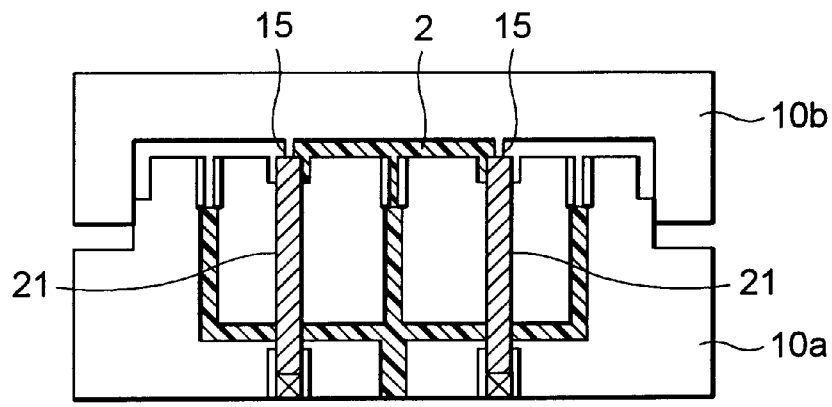
Figure 14:
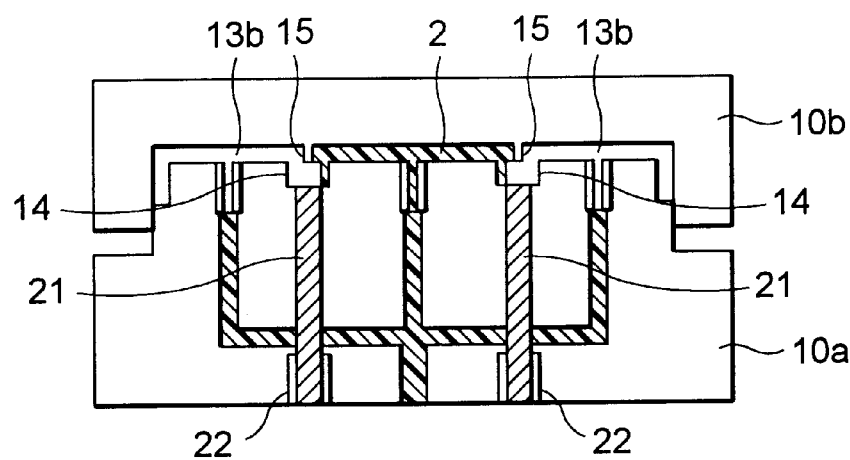

Thereafter ($T_5$ to $T_6$), from the first resin gate (16a) disposed in the first portion (region for forming the air-bag cover section; 13a), the molten first resin (2') is supplied with an amount required for forming the air-bag cover section as shown in FIG. 12. Then ($T_7$ to $T_8$), while the first and second molds (10a, 10b) are caused to come closer to each other till they attain a closed state as shown in FIG. 13, the first resin (2') is pressurized and compressed so as to mold the air-bag cover section (2).

During this period, it is necessary for the movable member (21) to maintain its close contact state with the protruded section (15) from the starting of the first resin supply till the molding of the air-bag cover section (2) by compression shaping.

After the air-bag cover section (2) is molded and a solidified layer is formed on at least the surface thereof ($T_9$ to $T_{10}$), the movable member (21) is moved (slid to the first position) so as to be received within the first mold (10a).

Figure 15:
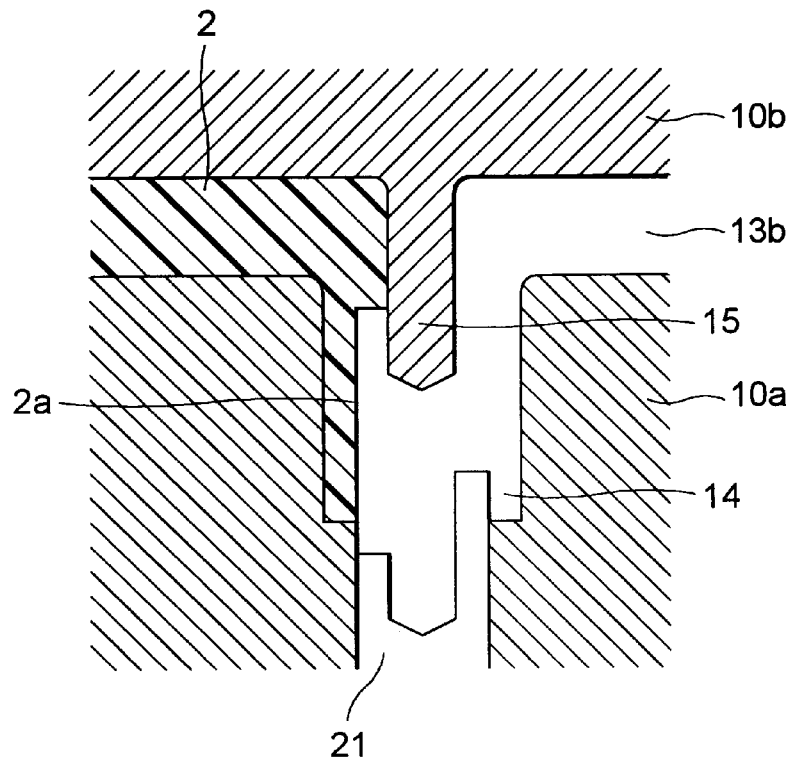
FIG. 15 is a partial cross-sectional view showing the state where the movable member is returned into the first mold after the first resin is supplied thereto.

Here, as shown in FIG. 15, in the area of the protruded section (15) and groove section (14), an end face of the resin is formed at the periphery (2a) of the air-bag cover section (2) having been in contact with the circumferential face of the movable member (21).

Figure 16:
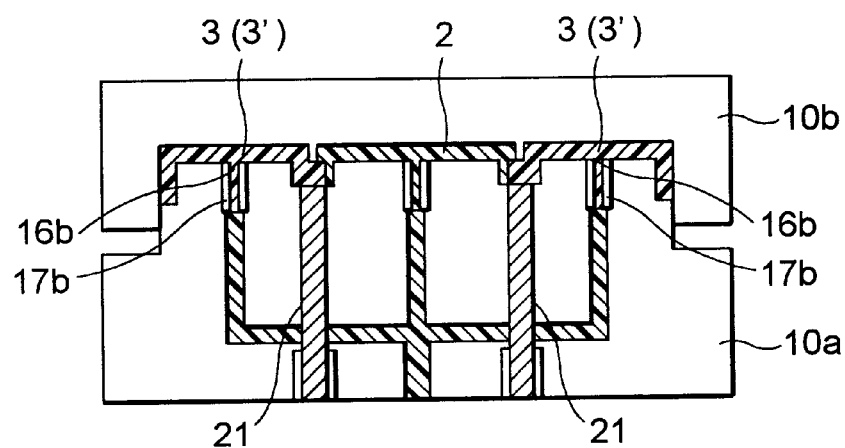
Figure 17:
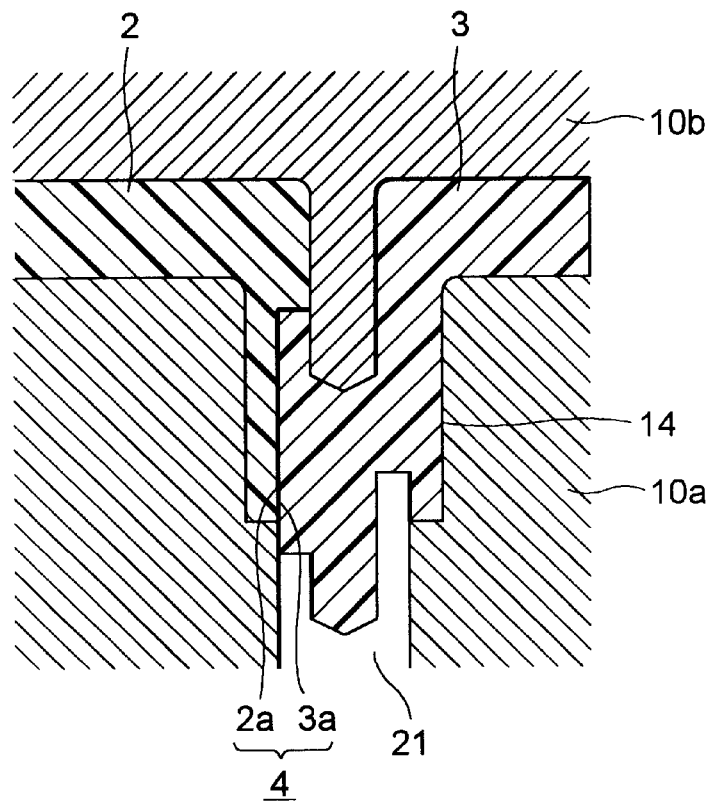
FIG. 17 is a partial cross-sectional view showing the state where the second resin is supplied after the movable member is returned into the first mold.

In this state ($T_{11}$ to $T_{12}$), from the second resin gate (16b) disposed in the second portion (region forming the other section (frame section); 13b), the molten second resin (3') is injected and supplied with an amount necessary for forming the frame section as shown in FIG. 16, thereby filling the second portion (13b) with the second resin (3'). Consequently, in the area of the protruded section (15) and groove section (14), as shown in FIG. 17, the flowing tip of thus supplied molten second resin comes into contact with the previously formed end face (2a) of the first resin, whereby the end face (2a) of first resin and the end face (3a) of second resin form the resin interface (4) and directly join together upon the bonding action between the resins.

Thereafter, the resins (2, 3) in the first and second molds (10a, 10b) are cooled so as to be completely solidified, and then the molds (10a, 10b) are opened so as to remove the product therefrom, whereby the integrally molded air-bag cover article shown in FIGS. 1 to 3 is obtained ($T_{13}$).

Though one preferred embodiment of the method of making the integrally molded air-bag cover article in accordance with the present invention has been explained in the foregoing, the method of the present invention should not be restricted thereto.

Namely, while the above-mentioned embodiment exemplifies the case where the air-bag cover section (2) is initially molded, the order of molding operations may be changed such that, before the molten resin is supplied to the first portion (13a) so as to mold the air-bag cover section (2), the other section (frame section; 3) is initially molded.

Figure 18:
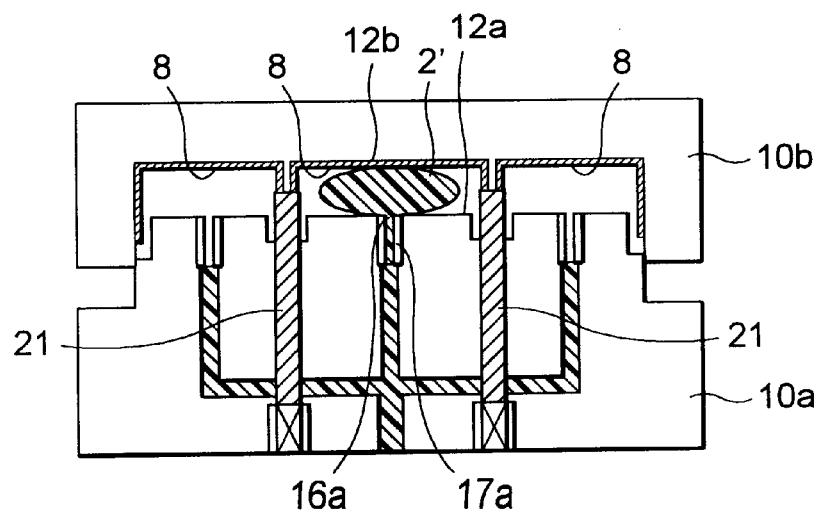
FIG. 18 is a schematic cross-sectional view showing the state of one manufacturing step in the method in accordance with the present invention, in which the molded article shown in FIG. 7 is manufactured by means of the mold assembly shown in FIG. 9 according to the timing chart shown in FIG. 10.

Also, by a molding process similar to that mentioned above except that the skin material (8) is disposed beforehand between the cavity face (12a) of the first mold (10a) and the cavity face (12b) of the second mold (10b) as shown in FIG. 18, the interior equipment (1) shown in FIG. 7, in which the skin material (8) is integrally attached to the surface thereof while partially being bent into the groove (6), can be manufactured.

In this integrally molded air-bag cover article (1), in the case where the skin material (8) is attached to the surface thereof, the aimed object cannot be attained when the skin material (8) is not broken together with the base material portion (2, 3). Accordingly, it is preferable that the incision (8a) be formed in a part of or the whole portion of the skin material (8) that is bent into the groove (6) and in contact with the bottom of the latter, such that the skin material (8) is broken along the incision (8a) simultaneously with the air-bag cover section (2) being cut off from the frame section (3) as the resin interface (4) is broken.

Thus manufactured is the integrally molded air-bag cover article (1), which is formed such that the resin interface in the resin junction (4) between the resin constituting the air-bag cover section (2) and the resin constituting the other section (3) is formed so as to longitudinally extend from the inner face of the groove (6) formed in the front surface thereof to the outer face of the protrusion (5) formed in the rear surface thereof. Here, as mentioned above, the fracture strength of the air-bag cover upon unfolding of the air bag can be adjusted by the area or molding condition (joining condition) of the resin interface (4). More specifically, the area of the resin interface (4) can be adjusted by the shape of the movable member (21), the magnitude of the protrusion (5), and the like.

Also, in order for the fracture strength to be adjusted by the molding condition, for example, in the case where the air-bag cover section (2) is molded in the above-mentioned method, when the supply of the molten resin for forming the other section (3) is retarded, the previously molded air-bag cover section (2) is further cooled, whereby the bonding strength of the resin junction (4) formed with the resin supplied thereafter becomes so low that it may become easier to break at the resin interface. By contrast, in the case where the molten resin for forming the other section (3) is supplied before the previously molded air-bag cover section (2) is sufficiently cooled, both resins join together in a high-temperature state, whereby they become harder to break at the resin interface. Thus, as timings for supplying both resins are controlled in terms of time or the cooling rate of the initially formed portion is regulated, the fracture strength of the resin junction (4) can be adjusted.

The integrally molded air-bag cover article in accordance with the present invention can securely and instantly be removed the air-bag cover upon inflation of the air bag at the time of a sudden impact, while normally maintaining the strength as a part of a vehicle interior equipment such as instrument panel, without necessitating any thin portion to be broken around the air-bag cover or discontinuously arranged through-holes to be broken formed by post-processing which may be problematic in terms of appearance. Also, since the integrally molded air-bag cover article in accordance with the present invention can easily be manufactured by a series of molding steps alone, which are similar to those for manufacturing a conventional vehicle interior equipment, its manufacturing and processing cost can be reduced. Further, as the molding condition for forming the resin junction is simply altered, the fracture strength required for the air-bag cover can arbitrarily be adjusted without affecting the designed surface of the product at all. Accordingly, the integrally molded air-bag cover article, in which the fracture strength of the air-bag cover is correctly controlled in response to the inflation pressure of the air bag, can efficiently be obtained.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 8-109272 (109272/1996) filed on Apr. 30, 1996 is hereby incorporated by reference.

What is claimed is:

1. An integrally molded air-bag cover article comprising an air-bag cover section which is made of a resin and has a periphery, and a frame section which is made of a resin and is integrally formed with said periphery by way of a weak section;

wherein said weak section is constituted by a resin junction in which an interface of the resin constituting said air-bag cover section and an interface of the resin constituting said frame section are joined together by a bonding action between said resins;

wherein a continuous groove and a continuous protrusion are respectively formed on a front surface and a rear surface of said integrally molded air-bag cover article; and wherein said weak section is formed so as to extend from an inner face of said groove to an outer face of said protrusion.

2. An integrally molded air-bag cover article according to claim 1, further comprising a skin material integrally attached to a front surface of said integrally molded air-bag cover article, a portion of said skin material being bent into said groove.

3. An integrally molded air-bag cover article according to claim 2, wherein at least a part of said skin material bent into said groove is provided with an incision.

4. An integrally molded air-bag cover article according to claim 1, wherein said resin junction is formed as both of said resins are solidified after a surface of one resin in which at least the surface thereof is solidified is in contact with the other resin in a molten state.

5. An integrally molded air-bag cover article according to claim 1, wherein an inner edge of said frame section projects to a rear side of the periphery of said air-bag cover section.

6. A method of making an integrally molded air-bag cover article of claim 1 by means of first and second molds, said first mold having a first cavity face provided with a continuous groove section and a continuous movable member adapted to project from an inner face of said groove section, said second mold having a second cavity face provided with a continuous protruded section corresponding to said groove section, said method comprising the steps of:

(a) projecting said movable member from an inner face of the groove section of said first mold so as to abut to an outer face of said protruded section, thereby parting a cavity formed between said first and second cavity faces into first and second portions;

(b) supplying a molten first resin to said first portion;

(c) cooling said first resin so as to form a solidified layer on at least a surface of said first resin;

(d) returning said movable member into said first mold;

(e) supplying a molten second resin to said second portion;

(f) solidifying said first and second resins by cooling; and (g) opening said first and second molds so as to remove said article therefrom.

7. A method according to claim 6, further comprising a step (h) of disposing a skin material between said first and second cavity faces prior to said step (a).

8. A method according to claim 6, wherein the cavity formed between said first and second cavity faces is placed in an open state in said steps (a) and (b); and wherein said method further comprises, between said steps (b) and (c), a step (i) of closing said first and second molds so as to place said cavity in a closed state.

9. A method according to claim 6, wherein said first resin constitutes the air-bag cover section, and said second resin constitutes the frame section integrally formed with the periphery of said air-bag cover section by way of the weak section.

\* \* \* \* \*